Figure 1:
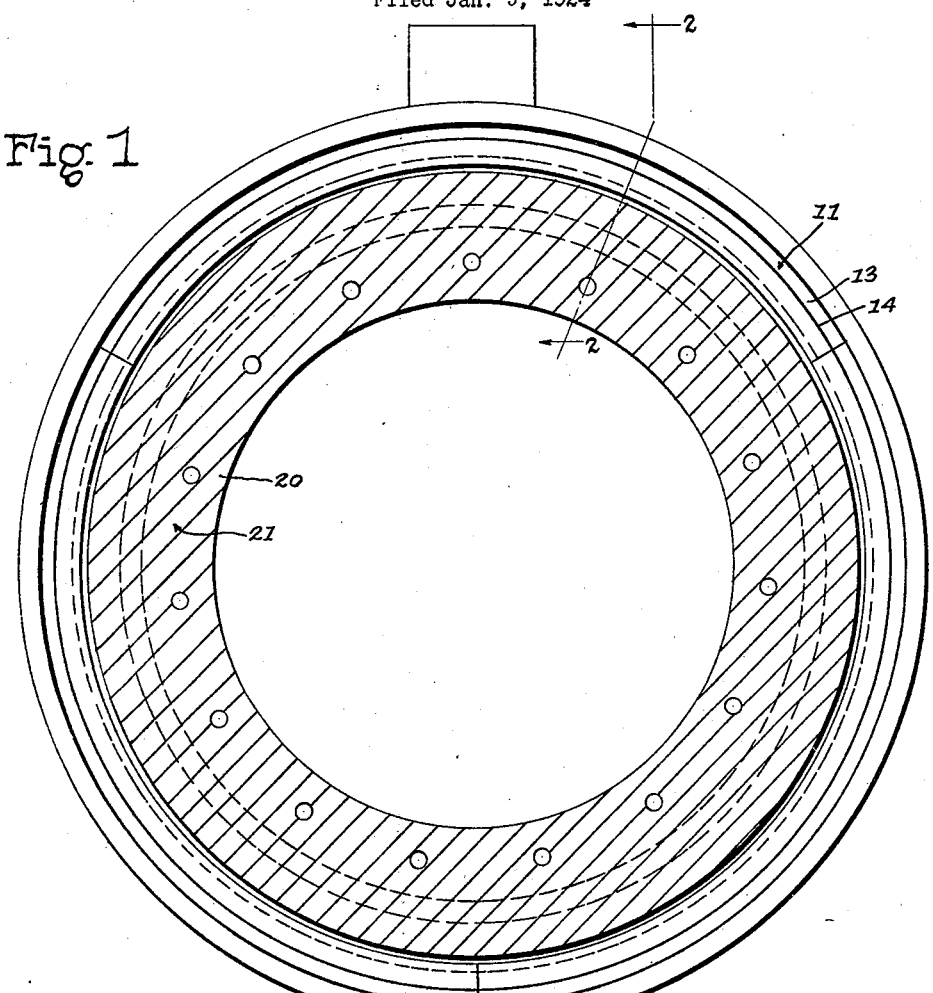

Feb. 10, 1925.                     1,526,046
W. A. BRUBAKER
TIRE MOLD
Filed Jan. 5, 1924

William A. Brubaker
Inventor
By Dunn and Freeman
Attys.

Patented Feb. 10, 1925.

1,526,046

UNITED STATES PATENT OFFICE.

WILLIAM A. BRUBAKER, OF AKRON, OHIO, ASSIGNOR TO HIMSELF AND CHARLES NIEMEYER, OF LITTLE ROCK, ARKANSAS.

TIRE MOLD.

Application filed January 5, 1924. Serial No. 684,662.

*To all whom it may concern:*

Be it known that I, WILLIAM A. BRUBAKER, a citizen of the United States, residing at Akron in the county of Summit and State of Ohio, have invented a certain new and useful Improvement in Tire Molds, of which the following is a full, clear, and exact description, reference being had to the accompanying drawings.

In molding pneumatic casings it is desirable to use a rigid core within the casing and a two part mold surrounding the casing. With casings constructed of square woven fabric this molding apparatus is permissible although occasionally the closing action of the mold causes the fabric to buckle and ruins the casing. In curing casings constructed of cord fabric the cords are ordinarily unable to resist the buckling effect occuring when the mold sections are forced together and accordingly this apparatus is entirely impractical for cord casings. In order to eliminate this buckling effect it has been proposed to employ a transversely divided tread ring provided with an exterior surface sloped either entirely in one direction or in both directions from a central ridge and to form upon the mold halves cooperating inclined surfaces so arranged that closing of the mold will force the tread plates radially against the tire and in this manner impress the nonskid design upon the tire tread. While this apparatus has been successful to some extent I find that it is not suitable for the construction of a casing having very short side walls and an extremely flat tread portion but that on the contrary in order to full mold such a casing it is neccessary that the tread rings be positioned with greater care than can be present when the tread ring positioning is accomplished automatically by the closing of the mold. My invention provides a mold suitable for this purpose and in the drawings accompanying this specification and forming a part thereof I have shown, for purposes of illustration, one form which my invention may assume.

Figure 2:
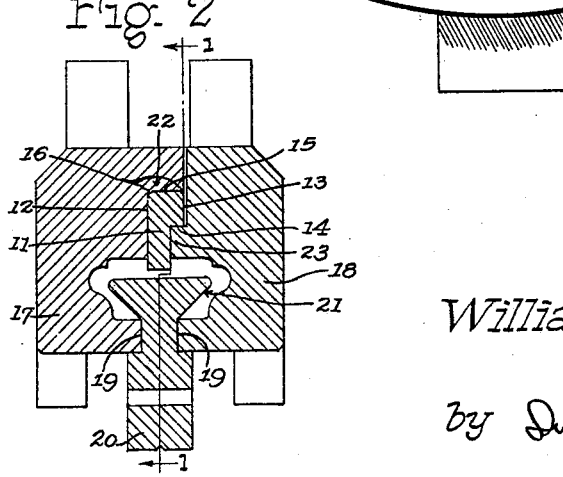

In these drawings:

Figure 1 is a central section on the line 1—1 of Figure 2, while Figure 2 is an enlarged section on the line 2—2 of Figure 1.

The embodiment of my invention herein shown comprises a ring 11 arranged to engage and mold the central portion of the tread of the casing and provided with a lateral face 12 substantially plain throughout, a lateral face 13 having an inwardly directed annular shoulder 14, and an exterior face 15 substantially perpendicular to the lateral faces 12 and 13 except at its edges where it is slightly beveled, as shown at 16, to facilitate assembly of the parts. Cooperating with this tread ring 11 are a pair of mold side plates 17 and 18 which engage the sides and bases of the casing and the lateral faces 19 of the ring portion 20 of the core 21. The mold plate 17 which engages the lateral face 12 of the tread ring 11 is provided with an inwardly directed annular shoulder 22 arranged to completely overlie the exterior face 15 of the tread ring 11 to thus prevent outward movement of the parts of the tread ring 11 after the mold has been assembled while the side plate 18 which engages the lateral face 13 of the tread ring 11 is provided with an outwardly directed annular shoulder 23 arranged to cooperate with the inwardly directed annular shoulder 14 of the tread ring 11 to thus prevent inward movement of any part of the tread ring 11 after the mold has been assembled.

It is obvious from the above description that I have provided a mold in which the tread ring may be assembled prior to the assembling of the mold and is not affected by the later positioning of the side plates and that I have provided a mold which may be assembled upon the casing without subjecting the casing to any appreciable buckling or distorting action in any direction. It will be obvious to those skilled in the art, however, that the particular embodiment of my invention herein disclosed may be variously changed and modified without sacrificing the advantages of my invention or departing from the spirit thereof and it will be understood, therefore, that this description is illustrative only and that my invention is not limited thereto.

I claim:

1. A pneumatic casing mold comprising a transversely split tread ring provided on one lateral face with an inwardly directed annular shoulder and having the other lateral face plane and having an external face substantially perpendicular to both of said lateral faces, a side plate arranged to abut the plane lateral face of said ring and to overlie the entire width of said external face of said ring, and a second side plate arranged to abut the shouldered side of said ring and to underlie said shoulder.

2. A pneumatic casing mold comprising a transversely split tread ring provided on one lateral face with an inwardly directed annular shoulder and having the other lateral face plane and having an external face substantially perpendicular to both of said lateral faces, a side plate arranged to abut the plane lateral face of said ring and to overlie said external face of said ring, and a second side plate arranged to abut the shouldered side of said ring and to underlie said shoulder.

3. A pneumatic casing mold comprising a transversely split tread ring provided on one lateral face with an inwardly directed annular shoulder and having the other lateral face plane, a side plate arranged to abut the plane lateral face of said ring and to overlie the entire width of the external face of said ring, and a second side plate arranged to abut the shouldered side of said ring and to underlie said shoulder.

4. A pneumatic casing mold comprising a transversely split tread ring provided on one lateral face with an inwardly directed annular shoulder and having the other lateral face plane, a side plate arranged to abut the plane lateral face of said ring and to overlie the external face of said ring, and a second side plate arranged to abut the shouldered side of said ring and to underlie said shoulder.

5. A pneumatic casing mold comprising a transversely split tread ring provided on one lateral face with an inwardly directed annular shoulder and having the other lateral face plane and having an external face substantially perpendicular to both of said lateral faces, a side plate arranged to abut the plane lateral face of said ring, and a second side plate arranged to abut the shouldered side of said ring and to underlie said shoulder.

6. A pneumatic casing mold comprising a transversely split tread ring provided on one lateral face with an inwardly directed annular shoulder and having the other lateral face plane, a side plate arranged to abut the plane lateral face of said ring, and a second side plate arranged to abut the shouldered side of said ring and to underlie said shoulder.

In testimony whereof, I hereunto affix my signature.

WM. A. BRUBAKER.